(12) United States Patent
Yoshimura et al.

(10) Patent No.: US 6,444,146 B2
(45) Date of Patent: Sep. 3, 2002

(54) PROCESS FOR PRODUCTION OF OPTICAL MATERIAL

(75) Inventors: Yuichi Yoshimura, Chiba-ken; Motoharu Takeuchi, Tokyo, both of (JP)

(73) Assignee: Mitsubishi Gas Chemical Co., Tokyo (JP)

( * ) Notice: Subject to any disclaimer, the term of this patent is extended or adjusted under 35 U.S.C. 154(b) by 42 days.

(21) Appl. No.: 09/757,629

(22) Filed: Jan. 11, 2001

(30) Foreign Application Priority Data

Jan. 19, 2000 (JP) .......................... 2000-011044

(51) Int. Cl.$^7$ .............................. G02B 3/00; G02B 5/00
(52) U.S. Cl. ................... 264/1.32; 524/81; 524/357; 524/363; 524/359; 528/378; 528/380; 568/335; 351/159; 264/299; 264/328.1
(58) Field of Search ............... 524/81, 357, 363, 524/359; 528/378, 380; 568/335; 351/159; 264/299, 328.1, 328.6, 1.32

(56) References Cited

U.S. PATENT DOCUMENTS

| 5,290,750 A | * | 3/1994 | Kushi et al. |
| 5,807,975 A | | 9/1998 | Amagai et al. |
| 5,945,504 A | | 8/1999 | Amagi et al. |
| 5,973,098 A | | 10/1999 | Keita et al. |
| 6,130,307 A | | 10/2000 | Amagai et al. |

FOREIGN PATENT DOCUMENTS

| EP | 0524654 | 1/1993 |
| EP | 0 936 233 A2 | 8/1999 |
| EP | 0950905 | 10/1999 |
| EP | 0978513 | 2/2000 |
| EP | 1024223 | 8/2000 |
| EP | 1046931 | 10/2000 |
| GB | 2034317 | 6/1980 |
| JP | 5-195446 | * 8/1993 |
| JP | 11-180977 | 7/1999 |

OTHER PUBLICATIONS

Database Chemabs. Caplus Accession No. 1999:236543, XP002157524 abstract; JP 11 100428A, Apr. 13, 1999.
Database Chemabs. Caplus Accession No. 1999:813939, XP002157525 abstract; JP 11 352302A, Dec. 24, 1999.
Database Chemabs. Caplus Accession No. 2000:659667, XP002157526 abstract.
Chem. Abstracts, vol. 133, No. 18, Oct. 30, 2000, XP002157523 & JP 2000 256435 A (Sep. 19, 2000).
Database Caplus, Abstract (AN–2001:210073), JP 2001–75058, , American Chem. Soc., Saito, et al., "Production of Colorless and Transparent Plastic Lenses", Mar. 23, 2001.

* cited by examiner

Primary Examiner—Robert Dawson
Assistant Examiner—Kuo-Liang Peng
(74) Attorney, Agent, or Firm—Antonelli, Terry, Stout & Kraus, LLP

(57) ABSTRACT

An improved process for producing optical materials with minimized yellowing is described. The process is characterized by polymerizing/curing a composition for optical materials after adding a bluing agent. With the use of the bluing agent, the yellowing is minimized even when a large amount of an ultraviolet light absorber is used to improve a light resistance of the resultant optical material, thereby enabling the production of optical materials having a colorless and transparent appearance and excellent optical properties.

10 Claims, No Drawings

PROCESS FOR PRODUCTION OF OPTICAL MATERIAL

BACKGROUND OF THE INVENTION

1. Field of the Invention

The present invention relates to a process for producing an optical material such as plastic lens, prisms, optical fibers, information recording substrates and filters, especially plastic spectacle lens.

2. Description of the Prior Art

Recently, plastic materials have been more widely used for the production of various optical materials, especially spectacle lens, due to their light weight, excellent toughness and high affinity to dye. These optical materials, especially spectacle lens, have been required to have in addition to low specific gravity, high transparency, low yellowness and good optical properties such as high refractive index and high Abbe's number. The high refractive index reduces the thickness of the lens, and the high and high Abbe's number reduces the chromatic aberration of the lens. The present inventors have found the novel episulfide compound capable of producing an optical material having a small thickness and a low chromatic aberration, i.e., a refractive index of 1.7 or more and an Abbe's number of 35 or more, and have filed patent applications relating thereto (U.S. Pat. Nos. 5,807,975 and 5,945,504, European Patent Publications 0978513 and 1024223, and Japanese Patent Application Laid-Open No. 11-180977, which are incorporated herein by reference).

However, these high-refractive index optical materials tend to be colored yellow upon polymerization. In particular, the yellowing of the materials is remarkable when a large amount of an ultraviolet light absorber is added to the optical materials to improve a light resistance.

SUMMARY OF THE INVENTION

Therefore, an object of the present invention is to improve the color tone of these high-refractive index optical materials.

As a result of extensive researches in view of the above object, the present inventors have found that a polymerizable composition for optical materials added with a bluing agent produces, through polymerization and curing, a colorless and transparent optical material having excellent optical properties. The present invention has been accomplished based on this finding.

Thus, the present invention provides a process for producing an optical material, comprising (1) adding a bluing agent to a composition for optical materials comprising a compound having at least one radical represented by the formula (I):

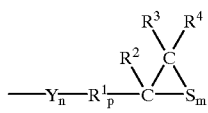

(I)

wherein $R^1$ is $C_1$–$C_{10}$ hydrocarbon group; $R^2$, $R^3$ and $R^4$ are each independently $C_1$–$C_{10}$ hydrocarbon group or hydrogen; Y is O, S, Se or Te; p is 0 or 1; m is an integer of 1 to 5; and n is an integer of 0 to 5; and subjecting the resultant composition to polymerization and curing.

DETAILED DESCRIPTION OF THE INVENTION

The optical materials produced from the compound having a radical represented by the formula (I) exhibit a high refractive index and a high Abbe's number and are well-balanced between both the properties. In the formula (I), $R^1$ is preferably methylene or ethylene, more preferably methylene; $R^2$, $R^3$ and $R^4$ are preferably hydrogen or methyl, more preferably hydrogen; p is 0 or 1, preferably 1; m is an integer of 1 to 5, preferably 1 or 2, more preferably 1; n is an integer of 0 to 5, preferably 0 to 4, more preferably 0 to 2; and Y is O, S, Se or Te, preferably O, S or Se, more preferably S or Se. The compound having the radical represented by the formula (I) may be use alone or in combination of two or more.

Examples of the compound having the radical represented by the formula (I) are listed below while classified into the groups (A) to (E):

(A) Compounds having in one molecule at least one radical represented by the formula (I) wherein n is 0;
(B) Compounds (a) having in one molecule at least one radical represented by the formula (I) wherein Y is O;
(C) Compounds (a) having in one molecule at least one radical represented by the formula (I) wherein Y is S;
(D) Compounds (a) having in one molecule at least one radical represented by the formula (I) wherein Y is Se; and
(E) Compounds (a) having in one molecule at least one radical represented by the formula (I) wherein Y is Te.

The group (A) to (E) compounds has a backbone structure derived from a chain compound, a branched compound, an alicyclic compound, an aromatic compound or a heterocyclic compound having nitrogen, oxygen, sulfur, selenium or tellurium as the heteroatom. The compounds may have a plurality of the above structures in one molecule. The compounds may also have a sulfide linkage, a selenide linkage, a telluride linkage, an ether linkage, a sulfone linkage, a ketone linkage, an ester linkage, an amide linkage or a urethane linkage in the molecule.

Examples of the group (A) compound include:

Organic compounds having a chain aliphatic backbone structure such as 1,1-bis(epithioethyl)methane, 1,1-bis(epidithioethyl)methane, 1-(epithioethyl)-1-(β-epithiopropyl)-methane, 1,1-bis(β-epithiopropyl)-methane, 1-(epithioethyl)-1-(β-epithiopropyl)ethane, 1,2-bis(β-epithiopropyl)ethane, 1,2-bis(β-epidithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutylthio)ethane, 1-(epithioethyl)-2-[2-(γ-epithiobutylthio)ethylthio]ethane, tetrakis(β-epithiopropyl)methane, 1,1,1-tris(β-epithiopropyl)propane, 1,3-bis(β-epithiopropyl)-1-(β-epithiopropyl)-2-thiapropane and 1,5-bis(β-epithiopropyl)-2,4-bis(β-epithiopropyl)-3-thiapentane;

Compounds having an alicyclic backbone structure such as 1,3-bis(epithioethyl)cyclohexane, 1,4-bis(epithioethyl)cyclohexane, 1,3-bis(β-epithiopropyl)cyclohexane, 1,4-bis(β-epithiopropyl)cyclohexane, bis[4-(epithioethyl)cyclohexyl]methane, bis[4-(β-epithiopropyl)cyclohexyl]methane, 2,2-bis[4-(epithioethyl)cyclohexyl]propane, 2,2-bis[4-(β-epithiopropyl)cyclohexyl]propane, bis[4-(β-epithiopropyl)cyclohexyl] sulfide, bis[4-(epithioethyl)cyclohexyl] sulfide, 2,5-bis(epithioethyl)-1,4-dithiane, 2,5-bis(β-epithiopropyl)-1,4-dithiane, 4-epithioethyl-1,2-cyclohexene sulfide, 4-epoxy-1,2-cyclohexene sulfide, 2,3-bis(1,2-epithioethyl)-1,4-diselenane, 2,5-bis(1,2-epithioethyl)-1,4-diselenane, 2,6-bis(1,2-epithioethyl)-1,4-diselenane, 2,3-bis(2,3-epithiopropyl)-1,4-diselenane, 2,5-bis(2,3-epithiopropyl)-1,4-diselenane, 2,6-bis(2,3-epithiopropyl)-1,4-diselenane, 2,4-bis(1,2-epithioethyl)-1,3- diselenane, 2,5-bis(1,2-epithioethyl)-1,3-diselenane, 2,6-bis(1,2-epithioethyl)-1,3-diselenane, 2,4-bis(2,4-epithiopropyl)-1,3-diselenane, 2,5-bis(2,4-epithiopropyl)-1,3-diselenane, 2,6-bis(2,4-epithiopropyl)-1,3-diselenane, 2,3-bis(1,2-epithioethyl)-1-thia-4-selenane, 2,5-bis(1,2-epithioethyl)-1-thia-4-selenane, 2,6-bis(1,2-epithioethyl)-1-thia-4-selenane, 3,5-bis(1,2-epithioethyl)-1-thia-4-selenane, 2,3-bis(2,3-epithiopropyl)-1-thia-4-selenane, 2,5-bis(2,3-epithiopropyl)-1-thia-4-selenane, 2,6-bis(2,3-epithiopropyl)-1-thia-4-selenane, 3,5-bis(2,3-epithiopropyl)-1-thia-4-selenane, 2,4-bis(1,2-epithioethyl)-1,3-diselenolane, 4,5-bis(1,2-epithioethyl)-1,3-diselenolane, 2,4-bis(2,4-epithiopropyl)-1,3-diselenolane, 4,5-bis(2,4-epithiopropyl)-1,3-diselenolane, 2,4 -bis(1,2-epithioethyl)-1-thia-3-selenolane, 2,5-bis(1,2-epithioethyl)-1-thia-3-selenolane, 4,5-bis(1,2-epithioethyl)-1-thia-3-selenolane, 2,4-bis(2,4-epithiopropyl)-1-thia-3-selenolane, 2,5-bis(2,4-epithiopropyl)-1-thia-3-selenolane, 4,5-bis(2,4-epithiopropyl)-1-thia-3-selenolane, 2,3-bis(1,2-epithioethyl)selenophane, 2,4-bis(1,2-epithioethyl)selenophane, 2,5-bis(1,2-epithioethyl)selenophane, 3,4-bis(1,2-epithioethyl)selenophane, 2,3-bis(2,3-epithiopropyl)selenophane, 2,4-bis(2,3-epithiopropyl)selenophane, 2,5-bis(2,3-epithiopropyl)selenophane, 3,4-bis(2,3-epithiopropyl)selenophane, 2,3-bis(1,2-epithioethyl)-1,4-ditellurane, 2,5-bis(1,2-epithioethyl)-1,4-ditellurane, 2,6-bis(1,2-epithioethyl)-1,4-ditellurane, 2,3-bis(2,3-epithiopropyl)-1,4-ditellurane, 2.5-bis(2,3-epithiopropyl)-1,4-ditellurane, 2,6-bis(2,3-epithiopropyl)-1,4-ditellurane, 2,4-bis(1,2-epithioethyl)-1,3-ditellurane, 2,5-bis(1,2-epithioethyl)-1,3-ditellurane, 2,6-bis(1,2-epithioethyl)-1,3-ditellurane, 2,4-bis(2,4-epithiopropyl)-1,3-ditellurane, 2,5-bis(2,4-epithiopropyl)-1,3-ditellurane, 2,6-bis(2,4-epithiopropyl)-1,3-ditellurane, 2,3-bis(1,2-epithioethyl)-1-thia-4-tellurane, 2,5-bis(1,2-epithioethyl)-1-thia-4-tellurane, 2,6-bis(1,2-epithioethyl)-1-thia-4-tellurane, 3,5-bis(1,2-epithioethyl)-1-thia-4-tellurane, 2,3-bis(2,3-epithiopropyl)-1-thia-4-tellurane, 2,5-bis(2,3-epithiopropyl)-1-thia-4-tellurane, 2,6-bis(2,3-epithiopropyl)-1-thia-4-tellurane, 3,5-bis(2,3-epithiopropyl)-1-thia-4-tellurane, 2,4-bis(1,2-epithioethyl)-1,3-ditellurolane, 4,5-bis(1,2-epithioethyl)-1,3-ditellurolane, 2,4-bis(2,4-epithiopropyl)-1,3-ditellurolane, 4,5-bis(2,4-epithiopropyl)-1,3-ditellurolane, 2,4-bis(1,2-epithioethyl)-1-thia-3-tellurolane, 2,5-bis(1,2-epithioethyl)-1-thia-3-tellurolane, 4,5-bis(1,2-epithioethyl)-1-thia-3-tellurolane, 2,4-bis(2,4-epithiopropyl)-1-thia-3-tellurolane, 2,5-bis(2,4-epithiopropyl)-1-thia-3-tellurolane, 4,5-bis(2,4-epithiopropyl)-1-thia-3-tellurolane, 2,3-bis(1,2-epithioethyl)tellurophane, 2,4-bis(1,2-epithioethyl)tellurophane, 2,5-bis(1,2-epithioethyl)tellurophane, 3,4-bis(1,2-epithioethyl)tellurophane, 2,3-bis(2,3-epithiopropyl)tellurophane, 2,4-bis(2,3-epithiopropyl)tellurophane, 2,5-bis(2,3-epithiopropyl)tellurophane and 3,4 -bis(2,3-epithiopropyl)tellurophane;

Compounds having an aromatic backbone structure such as 1,3-bis(epithioethyl)benzene, 1,4-bis(epithioethyl)benzene, 1,3-bis(β-epithiopropyl)benzene, 1,4-bis(β-epithiopropyl)benzene, bis[4-(epithioethyl)phenyl]methane, bis[4-(β-epithiopropyl)phenyl]methane, 2,2-bis[4-(epithioethyl)phenyl]propane, 2,2-bis[4-(β-epithiopropyl)phenyl]propane, bis[4-(epithioethyl)phenyl] sulfide, bis[4-(β-epithiopropyl)phenyl] sulfide, bis[4-(epithioethyl)phenyl] sulfone, bis[4-(β-epithiopropyl)phenyl] sulfone, 4,4'-bis(epithioethyl)biphenyl, and 4,4'-bis(β-epithiopropyl)biphenyl; and Compounds obtained by replacing at least one hydrogen of the epithio group in the above compounds with methyl.

Examples of the group (B) compound include:

Compounds having a chain aliphatic backbone structure such as bis(β-epithiopropyl) ether, bis(β-epidithiopropyl) ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxymethyl)propane, 1,4-bis(β-epithiopropyloxy)butane, 1,3-bis(β-epithiopropyloxy)butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, bis(epithioethyl) ether, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β-epithiopropyloxyethyl)oxyethyl]oxy]ethane, bis(5,6-epithio-3-oxahexyl) selenide, bis(5,6-epithio-3-oxahexyl) telluride, tetrakis(β-epithiopropyloxymethyl)methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis(β-epithiopropyloxymethyl)-3,6-dithiaoctane, 1,8-bis(β-epithiopropyloxy)-2,4,5-tris(β-epithiopropyloxymethyl)-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2- β-epithiopropyloxyethyl)oxymethyl]-3,7-dithianonane, 1,10-bis(β-epithiopropyloxy)-5,6-bis[(2-β-epithiopropyloxyethyl)oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)oxymethyl]-3,6,9-trithiaundecane and 1,11-bis(β-epithiopropyloxy)-4,7-bis(β-epithiopropyloxymethyl)-3,6,9-trithiaundecane;

Compounds having an alicyclic backbone structure such as 1,3-bis(β-epithiopropyloxy)cyclohexane, 1,4-bis(β-epithiopropyloxy)cyclohexane, 1,3-bis(β-epithiopropyloxymethyl)cyclohexane, 1,4-bis(β-epithiopropyloxymethyl)cyclohexane, bis[4-(β-epithiopropyloxy-cyclohexyl]methane, 2,2-bis[4-(β-epithiopropyloxy)cyclohexyl]propane, bis[4-(β-epithiopropyloxy)cyclohexyl] sulfide, 2,5-bis(β-epithiopropyloxymethyl)-1,4-dithiane, 2,5-bis(β-epithiopropyloxyethyloxymethyl)-1,4-dithiane, 2,4-bis(3,4-epithio-1-oxabutyl)-1,3-diselenolane, 4,5-bis(3,4-epithio-1-oxabutyl)-1,3-diselenolane, 4,5-bis(4,5-epithio-2-oxapentyl)-1,3-diselenolane, 2,4-bis(4,5-epithio-2-oxapentyl)-1,3-diselenolane, 2,4-bis(3,4-epithio-1-oxabutyl)-1-thia-3-selenolane, 2,5-bis(3,4-epithio-1-oxabutyl)-1-thia-3-selenolane, 4,5-bis(3,4-epithio-1-oxabutyl)-1-thia-3-selenolane, 2,4-bis(4,5-epithio-2-oxapentyl)-1-thia-3-selenolane, 2,5-bis(4,5-epithio-2-oxapentyl)-1-thia-3-selenolane, 4,5-bis(4,5 -epithio-2-oxapentyl)-1-thia-3-selenolane, bis(3,4-epithio-1-oxabutyl) tricycloselenaoctane, bis(3,4-epithio-1-oxabutyl) dicycloselenanonane, 2,3-bis(3,4-epithio-1-oxabutyl)

selenophane, 2,4-bis(3,4-epithio-1-oxabutyl)selenophane, 2,5-bis(3,4-epithio-1-oxabutyl)selenophane, 3,4-bis(3,4-epithio-1-oxabutyl)selenophane, 2,3-bis(4, 5-epithio-2-oxapentyl)selenophane, 2,4-bis(4,5-epithio-2-oxapenty)selenophane, 2,5-bis(4,5-epithio-2-oxapentyl)-selenophane, 3,4-bis(4,5-epithio-2-oxapentyl)selenophane, 2,3-bis(3,4-epithio-1-oxabutyl)-1,4-diselenane, 2,5-bis(3,4-epithio-1-oxabutyl)-1,4-diselenane, 2,6-bis(3,4-epithio-1-oxabutyl)-1,4-diselenane, 2,3-bis(4,5-epithio-2-oxapentyl)-1,4-diselenane, 2,5-bis(4,5-epithio-2-oxapentyl)-1,4-diselenane, 2,6-bis(4,5-epithio-2-oxapentyl)-1,4-diselenane, 2,4-bis(3,4-epithio-1-oxabutyl)-1,3-diselenane, 2,5-bis(3,4-epithio-1-oxabutyl)-1,3-diselenane, 2,6-bis(3,4-epithio-1-oxabutyl)-1,3-diselenane, 2,4-bis(4,5-epithio-2-oxapentyl)-1,3-diselenane, 2,5-bis(4,5-epithio-2-oxapentyl)-1,3-diselenane, 2,6-bis(4,5-epithio-2-oxapentyl)-1,3-diselenane, 2,3-bis(3,4-epithio-1-oxabutyl)-1-thia-4-selenane, 2,5-bis(3,4-epithio-1-oxabutyl)-1-thia-4-selenane, 2,6-bis(3,4-epithio-1-oxabutyl)-1-thia-4-selenane, 3,5-bis(3,4-epithio-1-oxabutyl)-1-thia-4-selenane, 2,3-bis(4,5-epithio-2-oxapentyl)-1-thia-4-selenane, 2,5-bis(4,5-epithio-2-oxapentyl)-1-thia-4-selenane, 2,6-bis(4,5-epithio-2-oxapentyl)-1-thia-4-selenane, 3,5-bis(4,5-epithio-2-oxapentyl)-1-thia-4-selenane, 2,4-bis(3,4-epithio-1-oxabutyl)-1,3-ditellurolane, 4,5-bis(3,4-epithio-1-oxabutyl)-1,3-ditellurolane, 2,4-bis(4,5-epithio-2-oxapentyl)-1,3-ditellurolane, 4,5-bis(4,5-epithio-2-oxapentyl)-1,3-ditellurolane, 2,4-bis(3,4-epithio-1-oxabutyl)-1-thia-3-tellurolane, 2,5-bis(3,4-epithio-1-oxabutyl)-1-thia-3-tellurolane, 4,5-bis(3,4-epithio-1-oxabutyl)-1-thia-3-tellurolane, 2,4-bis(4,5-epithio-2-oxapentyl)-1-thia-3-tellurolane, 2,5-bis(4,5-epithio-2-oxapentyl)-1-thia-3-tellurolane, 4,5-bis(4,5-epithio-2-oxapentyl)-1-thia-3-tellurolane, bis(3,4-epithio-1-oxabutyl)tricyclotelluraoctane, bis(3,4-epithio-1-oxabutyl) dicyclotelluranonane, 2,3-bis(3,4-epithio-1-oxabutyl)tellurophane, 2,4-bis(3,4-epithio-1-oxabutyl)tellurophane, 2,5-bis(3,4 -epithio-1-oxabutyl)tellurophane, 3,4-bis(3,4-epithio-1-oxabutyl)tellurophane, 2,3-bis(4,5-epithio-2-oxapentyl)tellurophane, 2,4-bis(4,5-epithio-2-oxapentyl)-tellurophane, 2,5-bis(4,5-epithio-2-oxapentyl)tellurophane, 3,4-bis(4,5-epitho-2-oxapentyl)tellurophane, 2,3-bis(3,4-epithio-1-oxabutyl)-1,4-ditellurane, 2,5-bis(3,4-epithio-1-oxabutyl)-1,4-ditellurane, 2,6-bis(3,4-epithio-1-oxabutyl)-1,4-ditellurane, 2,3-bis(4,5-epithio-2-oxapentyl)-1,4-ditellurane, 2,5-bis(4,5-epithio-2-oxapentyl)-1,4-ditellurane, 2,6-bis(4,5-epithio-2-oxapentyl)-1,4-ditellurane, 2,4-bis(3,4-epithio-1-oxabutyl)-1,3-ditellurane, 2,5-bis(3,4-epithio-1-oxabutyl)-1,3-ditellurane, 2,6-bis(3,4-epithio-1-oxabutyl)-1,3-ditellurane, 2,4-bis(4,5-epithio-2-oxapentyl)-1,3-ditellurane, 2,5-bis(4,5-epithio-2-oxapentyl)-1,3-ditellurane, 2,6-bis(4,5-epithio-2-oxapentyl)-1,3-ditellurane, 2,3-bis(3,4-epithio-1-oxabutyl)-1-thia-4-tellurane, 2,5-bis(3,4-epithio-1-oxabutyl)-1-thia-4-tellurane, 2,6-bis(3,4-epithio-1-oxabutyl)-1-thia-4-tellurane, 3,5-bis(3,4-epithio-1-oxabutyl)-1-thia-4-tellurane, 2,3-bis(4,5-epithio-2-oxapentyl)-1-thia-4-tellurane, 2,5-bis(4,5-epithio-2-oxapentyl)-1-thia-4-tellurane, 2,6-bis(4,5-epithio-2-oxapentyl)-1-thia-4-tellurane and 3,5-bis(4,5-epithio-2-oxapentyl)-1-thia-4-tellurane;

Compounds having an aromatic backbone structure such as 1,3-bis(β-epithiopropyloxy)benzene, 1,4-bis(β-epithiopropyloxy)benzene, 1,3-bis(β-epithiopropyloxymethyl)benzene, 1,4-bis(β-epithiopropyloxymethyl)benzene, bis[4-(β-epithiopropyl)phenyl]methane, 2,2-bis[4-(β-epithiopropylthio)phenyl]propane, bis[4-(β-epithiopropylthio)phenyl] sulfide, bis[4-(β-epithiopropylthio)phenyl] sulfone and 4,4'-bis(β-epithiopropylthio)biphenyl; and Compounds obtained by replacing at least one hydrogen of the epithio group in the above compounds with methyl.

Examples of the group (C) compound include:

Organic compounds having a chain aliphatic backbone structure such as bis(β-epithiopropyl) sulfide, bis(β-epidithiopropyl) sulfide, bis(β-epithiopropyl) disulfide, bis(β-epidithiopropyl) disulfide, bis(β-epithiopropyl) trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, bis(epithioethyl) sulfide, bis(epithioethyl) disulfide, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl)thioethyl]thio]ethane, tetrakis(β-epithiopropyl-thiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis[(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane, 1,11-bis(β-epithiopropylthio)-4,7-bis(β-epithiopropylthiomethyl)-3,6,9-trithiaundecane, tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane, 1,1,1-tri[2-(β-epithiopropylthiomethyl)acetylmethyl]propane, bis(5,6-epithio-3-thiahexyl) selenide, 2,3-bis(6,7-thioepoxy-1-selena-4-thiaheptyl)-1-(3,4-thioepoxy-1-thiabutyl)propane, 1,1,3,3-tetrakis(4,5-thioepoxy-2-thiapentyl)-2-selenapropane, bis(4,5-thioepoxy-2-thiapentyl)-3,6,9-triselenaundecane-1,11-bis(3,4-thioepoxy-1-thiabutyl), 1,4-bis(3,4-thioepoxy-1-thiabutyl)-2,3-bis(6,7-thioepoxy-1-selena-4-thiaheptyl)butane, tris(4,5-thioepoxy-2-thiapentyl)-3-selena-6-thiaoctane-1,8-bis(3,4-thioepoxy-1-thiabutyl), bis(5,6-epithio-3-thiahexyl) telluride, 2,3-bis(6,7-thioepoxy-1-tellura-4-thiaheptyl)-1-(3,4-thioepoxy-1-thiabutyl)propane, 1,1,3,3-tetrakis(4,5-thioepoxy-2-thiapentyl)-2-tellurapropane, bis(4,5-thioepoxy-2-thiapentyl)-3,6,9-tritelleraundecane-1,11-bis(3,4-thioepoxy- 1-thiabutyl), 1,4-bis(3,4-thioepoxy-1-thiabutyl)-2,3-bis(6,7-thioepoxy-1-tellura-4-thiaheptyl)butane and tris(4,5-thioepoxy-2-thiapentyl)-3-tellura-6-thiaoctane-1,8-bis(3,4-thioepoxy-1-thiabutyl);

Compounds having an alicyclic backbone structure such as 1,3-bis(β-epithiopropylthio)cyclohexane, 1,4-bis(β-epithiopropylthio)cyclohexane, 1,3-bis(β-epithiopropylthiomethyl)cyclohexane, 1,4-bis(β-epithiopropylthiomethyl)cyclohexane, bis[4-(β-epithiopropylthio)-cyclohexyl]methane, 2,2-bis[4-(β-epithiopropylthio)cyclohexyl]propane, bis[4-(β-epithiopropylthio)cyclohexyl] sulfide, 2,5-bis(β-epithiopropylthiomethyl)-1,4-dithiane, 2,5-bis(β-epithiopropylthioethylthiomethyl)-1,4-dithiane, 2,3-bis(3,4-epithio-1-thiabutyl)-1,4-diselenane, 2,5-bis(3,4-epithio-1-thiabutyl)-1,4-diselenane, 2,6-bis(3,4-epithio-1-thiabutyl)-1,4-diselenane, 2,3-bis(4,5-epithio-2-thiapentyl)-1,4-diselenane, 2,5-bis(4,5-epithio-2-thiapentyl)-1,4-diselenane, 2,6-bis(4,5-epithio-2-thiapentyl)-1,4-diselenane, 2,4-bis(3,4-epithio-1-thiabutyl)-1,3-diselenane, 2,5-bis(3,4-epithio-1-thiabutyl)-1,3-diselenane, 5,6 -bis(3,4-epithio-1-thiabutyl)-1,3-diselenane, 2,4-bis(4,5-epithio-2-thiapentyl)-1,3-diselenane, 2,5-bis(4,5-epithio-2-thiapentyl)-1,3-diselenane, 5,6-bis(4,5-epithio-2-thiapentyl)-1,3-diselenane, 2,3-bis(3,4-epithio-1-thiabutyl)-1-thia-4-selenane, 2,5-bis(3,4-epithio-1-thiabutyl)-1-thia-4-selenane, 2,6-bis(3,4-epithio-1-thiabutyl)-1-thia-4-selenane, 3,5-bis(3,4-epithio-1-thiabutyl)-1-thia-4-selenane, 2,3-bis(4,5-epithio-2-thiapentyl)-1-thia-4-selenane, 2,5-bis(4,5-epithio-2-thiapentyl)-1-thia-4-selenane, 2,6-bis(4,5-epithio-2-thiapentyl)-1-thia-4-selenane, 3,5-bis(4,5-epithio-2-thiapentyl)-1-thia-4-selenane, 2,4-bis(3,4-epithio-1-thiabutyl)-1,3-diselenolane, 4,5-bis(3,4-epithio-1-thiabutyl)-1,3-diselenolane, 2,4-bis(4,5-epithio-2-thiapentyl)-1,3-diselenolane, 4,5-bis(4,5-epithio-2-thiapentyl)-1,3-diselenolane, 2,4-bis(3,4-epithio-1-thiabutyl)-1-thia-3-selenolane, 2,5-bis(3,4-epithio-1-thiabutyl)-1-thia-3-selenolane, 4,5-bis(3,4-epithio-1-thiabutyl)-1-thia-3-selenolane, 2,4-bis(4,5-epithio-2-thiapentyl)-1-thia-3-selenolane, 2,5-bis(4,5-epithio-2-thiapentyl)-1-thia-3-selenolane, 4,5-bis(4,5-epithio-2-thiapentyl)-1-thia-3-selenolane, 2,6-bis(4,5-epithio-2-thiapentyl)-1,3,5-triselenane, bis(3,4-epithio-1-thiabutyl) tricycloselenaoctane, bis(3,4-epithio-1-thiabutyl) dicycloselenanonane, 2,3-bis(3,4-epithio-1-thiabutyl) selenophane, 2,4-bis(3,4-epithio-1-thiabutyl)selenophane, 2,5-bis(3,4-epithio-1-thiabutyl)selenophane, 3,4-bis(3,4-epithio-1-thiabutyl)selenophane, 2,3-bis(4,5-epithio-2-thiapentyl)selenophane, 2,4-bis(4,5-epithio-2-thiapentyl)selenophane, 2,5-bis(4,5-epithio-2-thiapentyl)selenophane, 3,4-bis(4,5-epithio-2-thiapentyl)selenophane, 2-(4,5-thioepoxy-2-thiapentyl)-5-(3,4-thioepoxy-1-thiabutyl)-1-selenacyclohexane, 2,3-bis(3,4-thioepoxy-1-thiabutyl)-1-selenacyclohexane, 2,4-bis(3,4-thioepoxy-1-thiabutyl)-1-selenacyclohexane, 2,5-bis(3,4-thioepoxy-1-thiabutyl)-1-selenacyclohexane, 2,6-bis(3,4-thioepoxy-1-thiabutyl)-1-selenacyclohexane, 3,4-bis(3,4-thioepoxy-1-thiabutyl)-1-selenacyclohexane, 3,5-bis(3,4-epoxy-1-thiabutyl)-1-selenacyclohexane, 4,5-bis(3,4-epoxy-1-thiabutyl)-1-selenacyclohexane, 2,3-bis(4,5-thioepoxy-2-thiapentyl)-1-selenacyclohexane, 2,4-bis(4,5-thioepoxy-2-thiapentyl)-1-selenacyclohexane, 2,5-bis(4,5-thioepoxy-2-thiapentyl)-1-selenacyclohexane, 2,6-bis(4,5-thioepoxy-2-thiapentyl)-1-selenacyclohexane, 3,4-bis(4,5-thioepoxy-2-thiapentyl)-1-selenacyclohexane, 3,5-bis(4,5-thioepoxy-2-thiapentyl)-1-selenacyclohexane, 4,5-bis(4,5-thioepoxy-2-thiapentyl)-1-selenacyclohexane, 2,3-bis(4,5-thioepoxy-2-thiapentyl)-1-selenacyclohexane, 2,4-bis(4,5-thioepoxy-2-thiapentyl)-1-selenacyclohexane, 2,5-bis(4,5-thioepoxy-2-thiapentyl)-1-selenacyclohexane, 2,6-bis(4,5-thioepoxy-2-thiapentyl)-1-selenacyclohexane, 3,4-bis(4,5-thioepoxy-2-thiapentyl)-1-selenacyclohexane, 3,5-bis(4,5-thioepoxy-2-thiapentyl)-1-selenacyclohexane, 4,5-bis(4,5-thioepoxy-2-thiapentyl)-1-selenacyclohexane, 4,5-bis(4,5-thioepoxy-2-thiapentyl)-1-selenacyclohexane, 2,3-bis(3,4-epithio-1-thiabutyl)-1,4-ditellurane, 2,5-bis(3,4-epithio-1-thiabutyl)-1,4-ditellurane, 2,6-bis(3,4-epithio-1-thiabutyl)-1,4-ditellurane, 2,3-bis(4,5-epithio-2-thiapentyl)-1,4-ditellurane, 2,5-bis(4,5-epithio-2-thiapentyl)-1,4-ditellurane, 2,6-bis(4,5-epithio-2-thiapentyl)-1,4-ditellurane, 2,4-bis(3,4-epithio-1-thiabutyl)-1,3-ditellurane, 2,5-bis(3,4-epithio-1-thiabutyl)-1,3-ditellurane, 5,6-bis(3,4-epithio-1-thiabutyl)-1,3-ditellurane, 2,4-bis(4,5-epithio-2-thiapentyl)-1,3-ditellurane, 2,5-bis(4,5-epithio-2-thiapentyl)-1,3-ditellurane, 5,6-bis(4,5-epithio-2-thiapentyl)-1,3-ditellurane, 2,3-bis(3,4-epithio-1-thiabutyl)-1-thia-4-tellurane, 2,5-bis(3,4-epithio-1-thiabutyl)-1-thia-4-tellurane, 2,6-bis(3,4-epithio-1-thiabutyl)-1-thia-4-tellurane, 3,5-bis(3,4-epithio-1-thiabutyl)-1-thia-4-tellurane, 2,3-bis(4,5-epithio-2-thiapentyl)-1-thia-4-tellurane, 2,5-bis(4,5-epithio-2-thiapentyl)-1-thia-4-tellurane, 2,6-bis(4,5-epithio-2-thiapentyl)-1-thia-4-tellurane, 3,5-bis(4,5-epithio-2-thiapentyl)-1-thia-4-tellurane, 2,4-bis(3,4-epithio-1-thiabutyl)-1,3-ditellurolane, 4,5-bis(3,4-epithio-1-thiabutyl)-1,3-ditellurolane, 2,4-bis(4,5-epithio-2-thiapentyl)-1,3-ditellurolane, 4,5-bis(4,5-epithio-2-thiapentyl)-1,3-ditellurolane, 2,4-bis(3,4-epithio-1-thiabutyl)-1-thia-3-tellurolane, 2,5-bis(3,4-epithio-1-thiabutyl)-1-thia-3-tellurolane, 4,5-bis(3,4-epithio-1-thiabutyl)-1-thia-3-tellurolane, 2,4-bis(4,5-epithio-2-thiapentyl)-1-thia-3-tellurolane, 2,5-bis(4,5-epithio-2-thiapentyl)-1 -thia-3-tellurolane, 4,5-bis(4,5-epithio-2-thiapentyl)-1-thia-3-tellurolane, 2,6-bis(4,5-epithio-2-thiapentyl)-1,3,5-tritellurane, bis(3,4-epithio-1-thiabutyl) tricyclotelluraoctane, bis(3,4-epithio-1-thiabutyl) dicyclotelluranonane, 2,3-bis(3,4-epithio-1-thiabutyl) tellurophane, 2,4-bis(3,4-epithio-1-thiabutyl)tellurophane, 2,5-bis(3,4-epithio-1-thiabutyl)tellurophane, 3,4-bis(3,4-epithio-1-thiabutyl)tellurophane, 2,3-bis(4,5-epithio-2-thiapentyl)tellurophane, 2,4-bis(4,5-epithio-2-thiapentyl) tellurophane, 2,5-bis(4,5-epithio-2-thiapentyl)tellurophane, 3,4-bis(4,5-epithio-2-thiapentyl)tellurophane, 2-(4,5-thioepoxy-2-thiapentyl)-5-(3,4-thioepoxy-1-thiabutyl)-1-telluracyclohexane, 2,3-bis(3,4-thioepoxy-1-thiabutyl)-1-telluracyclohexane, 2,4-bis(3,4-thioepoxy-1-thiabutyl)-1-telluracyclohexane, 2,5-bis(3,4-thioepoxy-1-thiabutyl)-1-tellura-cyclohexane, 2,6-bis(3,4-thioepoxy-1-thiabutyl)-1-telluracyclohexane, 3,4-bis(3,4-thioepoxy-1-thiabutyl)-1-telluracyclohexane, 3,5-bis(3,4-thioepoxy-1-thiabutyl)-1-telluracyclohexane, 4,5-bis(3,4-thioepoxy-1-thiabutyl)-1-telluracyclohexane, 2,3-bis(3,4-thioepoxy-1-thiabutyl)-1-telluracyclohexane, 2,4-bis(3,4-thioepoxy-1-thiabutyl)-1-telluracycdohexane, 2,5-bis(3,4-thioepoxy-1-thiabuty)-1-telluracyclohexane, 2,6-bis(3,4-thioepoxy-1-thiabutyl)-1-telluracyclohexane, 3,4-bis(3,4-thioepoxy-1-thiabutyl)-1-telluracyclohexane, 3,5-bis(3,4-thioepoxy-1-thiabutyl)-1-telluracyclohexane, 4,5-bis(3,4-thioepoxy-1-thiabutyl)-1-telluracyclohexane, 2,3-bis(4,5-thioepoxy-2-thiapentyl)-1-telluracyclohexane, 2,4-bis(4,5-thioepoxy-2-thiapentyl)-1-teluracyclohexane, 2,5-bis(4,5-thioepoxy-2-thiapentyl)-1-telluracyclohexane, 2,6-bis(4,5-thioepoxy-2-thiapentyl)-1-telluracyclohexane, 3,4-bis(4,5-thioepoxy-2-thiapentyl)-1-telluracyclohexane, 3,5-bis(4,5-thioepoxy-2-thiapentyl)-1-telluracyclohexane and 4,5-bis(4,5-thioepoxy-2-thiapentyl)-1-telluracyclohexane;

Compounds having an aromatic backbone structure such as 1,3-bis(β-epithiopropylthio)benzene, 1,4-bis(β-epithiopropylthio)benzene, 1,3-bis(β-epithiopropylthiomethyl)benzene, 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl] sulfide, bis[4-(β-epithiopropylthio)phenyl] sulfone and 4,4'-bis(β-epithiopropylthio)biphenyl; and Compounds obtained by replacing at least one hydrogen atom of the β-epithiopropyl group in the above compounds with methyl group.

Examples of the group (D) compound include:

Organic compounds having a chain aliphatic backbone structure such as bis(β-epithiopropyl) selenide, bis(β-epidithiopropyl) selenide, bis(β-epithiopropyl) diselenide, bis(β-epidithiopropyl) diselenide, bis(β-epithiopropyl) triselenide, bis(β-epithiopropylseleno)methane, 1,2-bis(β-epithiopropylseleno)ethane, 1,3-bis(β-epithiopropylseleno)propane, 1,2-bis(β-epithiopropylseleno)propane, bis(epithioethyl) selenide, bis(epithioethyl) diselenide, 1-(β-epithiopropylseleno)-2-(β-epithiopropylselenomethyl)propane, 1,4-bis(β-epithiopropylseleno)butane, 1,3-bis(β-epithiopropylseleno)butane, 1-(β-epithiopropylseleno)-3-(β-epithiopropylselenomethyl)butane, 1,5-bis(β-epithiopropylseleno)pentane, 1-(β-epithiopropylseleno)-4-(β-epithiopropylselenomethyl)pentane, 1,6-bis(β-epithiopropylseleno)hexane, 1-(β-epithiopropylseleno)-5-(β-epithiopropylselenomethyl)hexane, 1-(β-epithiopropylseleno)-2-[(2-β-epithiopropylselenoethyl)thio]ethane, 1-(β-epithiopropylseleno)-2-[[2-(2-β-epithiopropylselenoethyl)selenoethyl]thio]ethane, tetrakis(β-epithiopropylselenomethyl)methane, 1,1,1-tris(β-epithiopropylselenomethyl)propane, 1,5-bis(β-epithiopropylseleno)-2-(β-epithiopropylselenomethyl)-3-thiapentane, 1,5-bis(β-epithiopropylseleno)-2,4-bis(β-epithiopropylselenomethyl)-3-thiapentane, 1-(β-epithiopropylseleno)-2,2-bis(β-epithiopropylselenomethyl)-4-thiahexane, 1,5,6-tris(β-epithiopropylseleno)-4-(β-epithiopropylselenomethyl)-3-thiahexane, 1,8-bis(β-epithiopropylseleno)-4-(β-epithiopropylselenomethyl)-3,6-dithiaoctane, 1,8 -bis(β-epithiopropylseleno)-4,5-bis(β-epithiopropylselenomethyl)-3,6-dithiaoctane, 1,8-bis(β-epithiopropylseleno)-4,4-bis(β-epithiopropylselenomethyl)-3,6-dithiaoctane, 1,8-bis(β-epithiopropylseleno)-2,4,5-tris(β-epithiopropylselenomethyl)-3,6-dithiaoctane, 1,8-bis(β-epithiopropylseleno)-2,5-bis(β-epithiopropylselenomethyl)-3,6-ditbiaoctane, 1,9-bis(β-epithiopropylseleno)-5-(β-epithiopropylselenomethyl)-5-[(2-β-epithiopropylselenoethyl)selenomethyl]-3,7-dithianonane, 1,10-bis(β-epithiopropylseleno)-5,6-bis[(2-β-epithiopropylselenoethyl)thio]-3,6,9-trithiadecane, 1,11-bis(β-epithiopropylseleno)-4,8-bis(β-epithiopropylselenomethyl)-3,6,9-trithiaundecane, 1,11-bis(β-epithiopropylseleno)-5,7-bis(β-epithiopropylselenomethyl)-3,6,9-trithiaundecane, 1,11-bis(β-epithiopropylseleno)-5,7-[(2-β-epithiopropylselenoethyl)selenomethyl]-3,6,9-trithiaundecane, 1,11-bis(β-epithiopropylseleno)-4,7-bis(β-epithiopropylselenomethyl)-3,6,9-trithiaundecane, tetra[2-(β-epithiopropylseleno)acetylnmethyl]methane, 1,1,1-tri[2-(β-epithiopropylseleno)acetylmethyl]propane, tetra[2-(β-epithiopropylselenomethyl)acetylmethyl]methane, 1,1,1-tri[2-(β-epithiopropylselenomethyl)acetylmethyl]propane, bis (5,6-epithio-3-selenohexyl) selenide, 2,3-bis(6,7-thioepoxy-1-selena-4-selenoheptyl)-1-(3,4-thioepoxy-1-selenobutyl) propane, 1,1,3,3-tetrakis(4,5-thioepoxy-2-selenopentyl)-2-selenapropane, bis(4,5-thioepoxy-2-selenopentyl)-3,6,9-triselenaundecane-1,11-bis(3,4-thioepoxy-1-selenobutyl), 1,4-bis(3,4-thioepoxy-1-selenobutyl)-2,3-bis(6,7-thioepoxy-1-selena-4-selenoheptyl)butane, tris(4,5-thioepoxy-2-selenopentyl)-3-selena-6-thiaoctane-1,8-bis(3,4-thioepoxy-1-selenobutyl), bis(5,6-epithio-3-selenohexyl) telluride, 2,3-bis(6, 7-thioepoxy-1-tellura-4-selenoheptyl)-1-(3,4-thioepoxy-1-selenobutyl)propane, 1,1,3,3-tetrakis(4,5-thioepoxy-2-selenopentyl)-2-tellurapropane, bis(4,5-thioepoxy-2-selenopentyl)-3,6,9-tritelleraundecane-1,11-bis(3,4-thioepoxy-1-selenobutyl), 1,4-bis(3,4-thioepoxy-1-selenobutyl)-2.3-bis(6,7-thioepoxy-1-tellura-4-selenoheptyl)butane and tris(4,5-thiepoxy-2-selenopentyl)-3-tellura-6-thiaoctane-1,8-bis(3,4-thioepoxy-1-selenobutyl);

Compounds having an alicyclic backbone structure such as 1,3-bis(β-epithiopropylseleno)cyclohexane, 1,4-bis(β-epithiopropylseleno)cyclohexane, 1,3-bis(β-epithiopropylselenomethyl)cycdohexane, 1,4-bis(β-epithiopropylselenomethyl)cyclohexane, bis[4-(β-epithiopropylseleno)cyclohexyl]methane, 2,2-bis[4-(β-epithiopropylseleno)cyclohexyl]propane, bis[4-(β-epithiopropylseleno)cyclohexyl] sulfide, 2,5-bis(β-epithiopropylselenomethyl)-1,4-dithiane, 2,5-bis(β-epithiopropylselenoethylthiomethyl)-1,4-dithiane, 2,3-bis(3,4-epithio-1-selenobutyl)-1,4-diselenane, 2,5-bis(3,4-epithio-1-selenobutyl)-1,4-diselenane, 2,6-bis(3,4-epithio-1-selenobutyl)-1,4-diselenane, 2,3-bis(4,5-epithio-2-selenopentyl)-1,4-diselenane, 2,5-bis(4,5-epithio-2-selenopentyl)-1,4-diselenane, 2,6-bis(4,5-epithio-2-selenopentyl)-1,4-diselenane, 2,4-bis(3,4-epithio-1-selenobutyl)-1,3-diselenane, 2,5-bis(3,4-epithio-1-selenobutyl)-1,3-diselenane, 5,6-bis(3,4-epithio-1-selenobutyl)-1,3-diselenane, 2,4-bis(4,5-epithio-2-selenopentyl)-1,3-diselenane, 2,5-bis(4,5-epithio-2-selenopentyl)-1,3-diselenane, 5,6-bis(4,5-epithio-2-selenopentyl)-1,3-diselenane, 2,3-bis(3,4-epithio-1-selenobutyl)-1-thia-4-selenane, 2,5-bis(3,4-epithio-1-selenobutyl)-1-thia-4-selenane, 2,6-bis(3,4-epithio-1-selenobutyl)-1-thia-4-selenane, 3,5-bis(3,4-epithio-1-selenobutyl)-1-thia-4-selenane, 2,3-bis(4,5-epithio-2-selenopentyl)-1-thia-4-selenane, 2,5-bis(4,5-epithio-2-selenopentyl)-1-thia-4-selenane, 2,6-bis(4,5-epithio-2-selenopentyl)-1-thia-4-selenane, 3,5-bis(4,5-epithio-2-selenopentyl)-1-thia-4-selenane, 2,4-bis(3,4-epithio-1-selenobutyl)-1,3-diselenolane, 4,5-bis(3,4-epithio-1-selenobutyl)-1,3-diselenolane, 2,4-bis(4,5-epithio-2-selenopentyl)-1,3-diselenolane, 4,5-bis(4,5-epithio-2-selenopentyl)-1,3-diselenolane, 2,4-bis(3,4-epithio-1-selenobutyl)-1-thia-3-selenolane, 2,5-bis(3,4-epithio-1-selenobutyl)-1-thia-3-selenolane, 4,5-bis(3,4-epithio-1-selenobutyl)-1-thia-3-selenolane, 2,4-bis(4,5-epithio-2-selenopentyl)- 1-thia-3-selenolane, 2,5-bis(4,5-epithio-2-selenopentyl)-1-thia-3-selenolane, 4,5-bis(4,5-epithio-2-selenopentyl)-1-thia-3-selenolane, 2,6-bis(4,5-epithio-2-selenopentyl)-1,3,5-triselenane, bis(3,4-epithio-1-selenobutyl)tricycloselenaoctane, bis(3,4-epithio-1-selenobutyl)dicycloselenanonane, 2,3-bis(3,4-epithio-1-selenobutyl)selenophane, 2,4-bis(3,4-epithio-1-selenobutyl) selenophane, 2,5-bis(3,4-epithio-1-selenobutyl) selenophane, 3,4-bis(3,4-epithio-1-selenobutyl) selenophane, 2,3-bis(4,5-epithio-2-selenopentyl) selenophane, 2,4-bis(4,5-epithio-2-selenopentyl) selenophane, 2,5-bis(4,5-epithio-2-selenopentyl) selenophane, 3,4-bis(4,5-epithio-2-selenopentyl) selenophane, 2-(4,5-thioepoxy-2-selenopentyl)-5-(3,4- thioepoxy-1-selenobutyl)-1-selenacyclohexane, 2,3-, 2,4-, 2,5-, 2,6-, 3,4-, 3,5- or 4,5-bis(3,4-thioepoxy-1-selenobutyl)-1-selenacyelohexane, 2,3-, 2,4-, 2,5-, 2,6-, 3,4-, 3,5- or 4,5-bis(4,5-thioepoxy-2-selenopentyl)-1-selenacyclohexane, 2,3-, 2,5- or 2,6-bis(3,4-epithio-1-selenobutyl)-1,4-diteliurane, 2,3-, 2,5- or 2,6-bis(4,5-epithio-2-selenopentyl)-1,4-ditellurane, 2,4-, 2,5- or 5,6-bis(3,4-epithio-1-selenobutyl)-1,3-ditellurane, 2,4-, 2,5- or 5,6-bis(4,5-epithio-2-selenopentyl)-1,3-ditellurane, 2,3-, 2,5-, 2,6- or 3,5-bis(3,4-epithio-1-selenobutyl)-1-thia-4-tellurane, 2,3-, 2,5-, 2,6- or 3,5-bis(4,5-epithio-2-selenopentyl)-1-thia-4-tellurane, 2,4- or 4,5-bis(3,4-epithio-1-selenobutyl)-1,3-ditellurolane, 2,4- or 4,5-bis(4,5-epithio-2-selenopentyl)-1,3-ditellurolane, 2,4-, 2,5- or 4,5-bis(3,4-epithio-1-selenobutyl)-1-thia-3-telluroane, 2,4-, 2,5- or 4,5-bis(4,5-epithio-2-selenopentyl)-1-thia-3-tellurolane, 2,6-bis(4,5-epithio-2-selenopentyl)-1,3,5-tritellurane, bis(3,4-epithio-1-selenobutyl)triyclotelluraoctane, bis(3,4-epithio-1-selenobutyl)dicyclotelluranonane, 2,3-, 2,4-, 2,5- or 3,4-bis(3,4-epithio-1-selenobutyl)tellurophane, 2,3-, 2,4-, 2,5- or 3,4-bis(4,5-epithio-2-selenopentyl)tellurophane, 2-(4,5-thioepoxy-2-selenopentyl)-5-(3,4-thioepoxy-1-selenobutyl)-1-telluracyclohexane, 2,3-, 2,4-, 2,5-, 2,6-, 3,4-, 3,5- or 4,5-bis(3,4-thioepoxy-1-selenobutyl)-1-telluracyclohexane, and 2,3-, 2,4-, 2,5-, 2,6-, 3,4-, 3,5- or 4,5-bis(4,5-thioepoxy-2-selenopentyl)-1-telluracyclohexane;

Compounds having an aromatic backbone structure such as 1,3- or 1,4-bis(β-epithiopropylseleno)benzene, 1,3- or 1,4-bis(β-epithiopropylselenomethyl)benzene, bis[4-(β-epithiopropylseleno)phenyl]methane, 2,2-bis[4-(β-epithiopropylseleno)phenyl]propane, bis[4-(β-epithiopropylseleno)phenyl]sulfide, bis[4-(β-epithiopropylseleno)phenyl]sulfone and 4,4'-bis(β-epithiopropylseleno)biphenyl; and Compounds obtained by replacing at least one hydrogen of the β-epithiopropyl group in the above compounds with methyl.

Examples of the group (E) compound include:

Organic compounds having a chain aliphatic backbone structure such as bis(β-epithiopropyl) telluride, bis(β-epidithiopropyl) telluride, bis(β-epithiopropyl) ditelluride, bis(β-epidithiopropyl) ditelluride, bis(β-epithiopropyl) tritelluride, bis(β-epithiopropylteluro)methane, 1,2-bis(β-epithiopropyltelluro)ethane, 1,3-bis(β-epithiopropyltelluro)propane, 1,2-bis(β-epithiopropyltelluro)propane, bis(epithioethyl) telluride, bis(epithioethyl) ditelluride, 1-(β-epithiopropyltelluro)-2-(β-epithiopropyltelluromethyl)propane, 1,4-bis(β-epithiopropyltelluro)butane, 1,3-bis(β-epithiopropyltelluro)butane, 1-(β-epithiopropyltelluro)-3-(β-epithiopropyltelluromethyl)-butane, 1,5-bis(β-epithiopropyltelluro)pentane, 1-(β-epithiopropyltelluro)-4-(β-epithiopropyltelluromethyl)pentane, 1,6-bis(β-epithiopropyltelluro)hexane, 1-(β-epithiopropyltelluro)-5-(β-epithiopropyltelluromethyl)hexane, 1-(β-epithiopropyltelluro)-2-[(2-β-epithiopropyltelluroethyl)thio]ethane, 1-(β-epithiopropyltelluro)-2-[[2-(2-β-epithiopropyltelluroethyl)telluroethyl]thio]ethane, tetrakis(β-epithiopropyltelluromethyl)methane, 1,1,1-tris(β-epithiopropyltelluromethyl)propane, 1,5-bis(β-epithiopropyltelluro)-2-(β-epithiopropyltelluromethyl)-3-thiapentane, 1,5-bis(β-epithiopropyltelluro)-2,4-bis(β-epithiopropyltelluromethyl)-3-thiapentane, 1-(β-epithiopropyltelluro)-2,2-bis(β-epithiopropyltelluromethyl)-4thiahexane, 1,5,6-tris(β-epithiopropylteliuro)-4-(β-epithiopropyltelluromethyl)-3-thiahexane, 1,8-bis(β-epithiopropyltelluro)-4-(β-epithiopropyltelluromethyl)-3,6-dithiaoctane, 1,8-bis(β-epithiopropyltelluro)-4,5-bis(β-epithiopropyltelluromethyl)-3,6-dithiaoctane, 1,8-bis(β-epithiopropyltelluro)-4,4-bis(β-epithiopropyltelluromethyl)-3,6-dithiaoctane, 1,8-bis(β-epithiopropyltelluro)-2,4,5-tris(β-epithiopropyltelluromethyl)-3,6-dithiaoctane, 1,8-bis(β-epithiopropyltelluro)-2,5-bis(β-epithiopropyltelluromethyl)-3,6-dithiaoctane, 1,9-bis(β-epithiopropyltelluro)-5-(β-epithiopropyltelluromethyl)-5-[(2-β-epithiopropyltelluroethyl)selenomethyl]-3,7-dithianonane, 1,10-bis(β-epithiopropyltelluro)-5,6-bis[(2-β-epithiopropyltelluroethyl)thio]-3,6,9-trithiadecane, 1,11-bis(β-epithiopropyltelluro)-4,8-bis(β-epithiopropyltelluromethyl)-3,6,9-trithiaundecane, 1,11-bis(β-epithiopropyltelluro)-5,7-bis(β-epithiopropyltelluromethyl)-3,6,9-trithiaundecane, 1,11-bis(β-epithiopropyltelluro)-5,7-[(2-β-epithiopropyltelluroethyl)selenomethyl]-3,6,9-trithiaundecane, 1,11-bis(β-epithiopropyltelluro)-4,7-bis(β-epithiopropyltelluromethy )-3,6,9-trithiaundecane, tetra[2-(β-epithiopropyltelluro)acetylmethyl]methane, 1,1,1-tri[2-(β-epithiopropyltelluro)acetylmethyl]propane, tetra[2-(β-epithiopropyltelluromethyl)acetylmethyl]methane, 1,1,1-tri[2-(β-epithiopropyltelluromethyl)acetylmethyl]propane, bis(5,6-epithio-3-tellurohexyl) selenide, 2,3-bis(6,7-thioepoxy-1-selena-4-telluroheptyl)-1-(3,4-thioepoxy-1-tellurobutyl)propane, 1,1,3,3-tetrakis(4,5-thioepoxy-2-telluropentyl)-2-selenapropane, bis(4,5-thioepoxy-2-telluropentyl)-3,6,9-triselenaundecane-1,11-bis(3,4-thioepoxy-1-tellurobutyl), 1,4-bis(3,4-thioepoxy-1-tellurobutyl)-2,3-bis(6,7-thioepoxy-1-selena-4-telluroheptyl)butane, tris(4,5-thioepoxy-2-telluropentyl)-3-selena-6-thiaoctane-1,8-bis(3,4-thioepoxy 1-tellurobutyl), bis(5,6-epithio-3-tellurohexyl) telluride, 2,3-bis(6,7-thioepoxy-1-tellura-4-telluroheptyl)-1-(3,4-thioepoxy-1-tellurobutyl)propane, 1,1,3,3 -tetrakis(4,5-thioepoxy-2-telluropentyl)-2-tellurapropane, bis(4,5-thioepoxy-2-telluropentyl)-3,6,9-tritelleraundecane-1,11-bis(3,4-thioepoxy-1-tellurobutyl), 1,4-bis(3,4-thioepoxy-1-tellurobutyl)-2,3-bis(6,7-thioepoxy-1-tellura-4-telluroheptyl)butane and tris(4,5-thiepoxy-2-telluropentyl)-3-tellura-6-thiaoctane-1,8-bis(3,4-thioepoxy-1-tellurobutyl);

Compounds having an alicyclic backbone structure such as 1,3-bis(β-epithiopropyltelluro)cyclohexane, 1,4-bis(β-epithiopropyltelluro)cyclohexane, 1,3-bis(β-epithiopropyltelluromethyl)cyclohexane, 1,4-bis(β-epithiopropyltelluromethyl)cyclohexane, bis[4-(β-epithiopropyltelluro)cyclohexyl]methane, 2,2-bis[4-(β-epithiopropyltelluro)cyclohexyl]propane, bis[4-(β-epithiopropyltelluro)cyclohexyl] sulfide, 2,5-bis(β-epithiopropyltelluromethyl)-1,4-dithiane, 2,5-bis(β-epithiopropyltelluroethylthiomethyl)-1,4-dithiane, 2,3-, 2,5- or 2,6-bis(3,4-epithio-1-tellurobutyl)-1,4-diselenane, 2,3-bis(4,5-epithio-2-telluropentyl)-1,4-diselenane, 2,5-bis(4,5-epithio-2-telluropentyl)-1,4-diselenane, 2,6-bis(4,5-epithio-2-telluropentyl)-1,4-diselenane, 2,4-bis(3,4-epithio-1-tellurobutyl)-1,3-diselenane, 2,5-bis(3,4-epithio-1-tellurobutyl)-1,3-diselenane, 5,6-bis(3,4-epithio 1-tellurobutyl)-1,3-diselenane, 2,4-bis(4,5-epithio-2-telluropentyl)-1,3-diselenane, 2,5-bis(4,5-epithio-2-telluropentyl)-1,3-diselenane, 5,6-bis(4,5-epithio-2-telluropentyl)-1,3-diselenane, 2,3-bis(3,4-epithio-1-tellurobutyl)-1-thia-4-selenane, 2,5-bis(3,4-epithio-1-tellurobutyl)-1-thia-4-selenane, 2,6-bis(3,4-epithio-1-tellurobutyl)-1-thia-4-selenane, 3,5-bis(3, 4-epithio-1-tellurobutyl)-1-thia-4-selenane, 2,3-bis(4,5-epithio-2- telluropentyl)-1-thia-4-selenane, 2,5-bis(4,5-epithio-2-telluropentyl)-1-thia-4-selenane, 2,6-bis(4,5-epithio-2-telluropentyl)-1-thia-4-selenane, 3,5-bis(4,5-epithio-2-telluropentyl)-1-thia-4-selenolane, 2,4-bis(3,4-epithio-1-tellurobutyl)-1,3-diselenolane, 4,5-bis(3,4-epithio-1-tellurobutyl)-1,3-diselenolane, 2,4- or 4,5-bis(4,5-epithio-2-telluropentyl)-1,3-diselenolane, 2,4-, 2,5- or 4,5-bis(3,4-epithio-1-tellurobutyl)-1-thia-3-selenoolane, 2,4-, 2,5- or 4,5-bis(4,5-epithio-2 -telluropentyl)-1-thia-3-selenolane, 2,6-bis(4,5-epithio-2-telluropentyl)-1,3,5-triselenane, bis(3, 4-epithio-1-tellurobutyl)tricycloselenaoctane, bis(3,4-epithio-1-tellurobutyl)dicycloselenanonane, 2,3-, 2,4-, 2,5- or 3,4-bis(3,4-epithio-1-tellurobutyl)selenophane, 2,3-, 2,4-, 2,5- or 3,4-bis(4,5-epithio-2-telluropentyl)selenophane, 2-(4,5-thioepoxy-2-telluropentyl)-5-(3,4-thioepoxy-1-tellurobutyl)-1-selenacyclohexane, 2,3-, 2,4-, 2,5-, 2,6-, 3,4-, 3,5- or 4,5-bis(3,4-thioepoxy-1-tellurobutyl)-1-selenacyclohexane, 2,3-, 2,4-, 2,5-, 2,6-, 3,4-, 3,5- or 4,5-bis(4,5-thioepoxy-2-telluropentyl)-1-selenacyclohexane, 2,3-, 2,5- or 2,6-bis(3,4-epithio-1-tellurobutyl)-1,4-ditellurane, 2,3-, 2,5- or 2,6-bis(4,5-epitbio-2-telluropentyl)-1,4-ditellurane, 2,4-, 2,5- or 5,6-bis(3,4-epithio-1-tellurobutyl)-1,3-ditellurane, 2,4-, 2,5- or 5,6-bis(4,5-epithio-2-telluropentyl)-1,3-ditellurane, 2,3-, 2,5-, 2,6- or 3,5-bis(3,4-epithio-1-tellurobutyl)-1-thia-4-tellurane, 2,3-, 2,5-, 2,6- or 3,5-bis(4,5-epithio-2-telluropentyl)-1-thia-4-tellurane, 2,4- or 4,5-bis(3,4-epithio-1-tellurobutyl)-1,3-ditellurolane, 2,4- or 4,5-bis(4,5-epithio-2-telluropentyl)-1, 3-ditellurolane, 2,4-, 2,5- or 4,5-bis(3,4-epithio-1-tellurobutyl)-1-thia-3-tellurolane, 2,4-, 2,5- or 4,5-bis(4,5-epithio-2-telluropentyl)-1-thia-3-tellurolane, 2,6-bis(4,5-epithio-2-telluropentyl)-1,3,5-tritellurane, bis(3,4-epithio-1-tellurobutyl)tricyclotelluraoctane, bis(3,4-epithio-1-tellurobutyl)dicyclotelluranonane, 2,3-, 2,4-, 2,5- or 3,4-bis (3,4-epithio-1-tellurobutyl)tellurophane, 2,3-, 2,4-, 2,5- or 3,4-bis(4,5-epithio-2-telluropentyl)tellurophane, 2-(4,5-thioepoxy-2-telluropentyl)-5-(3,4-thioepoxy-1-tellurobutyl)-1-telluracyclohexane, 2,3-, 2,4-, 2,5-, 2,6-, 3,4-, 3,5- or 4,5-bis(3,4-thioepoxy-1-tellurobutyl)-1telluracyclohexane, and 2,3-, 2,4-, 2,5-, 2,6-, 3,4-, 3,5- or 4,5-bis(4,5-thioepoxy-2-telluropentyl)-1-telluracyclohexane;

Compounds having an aromatic backbone structure such as 1,3- or 1,4-bis(β-epithiopropyltelluro)benzene, 1,3- or 1,4-bis(β-epithiopropyltelluromethyl)benzene, bis[4-(β-epithiopropyltelluro)phenyl]methane, 2,2-bis[4-(β-epithiopropyltelluro)phenyl]propane, bis[4-(β-epithiopropyltelluro)phenyl] sulfide, bis[4-(β-epithiopropyltelluro)phenyl] sulfone and 4,4'-bis(β-epithiopropyltelluro)biphenyl; and Compounds obtained by replacing at least one hydrogen of the β-epithiopropyl group in the above compounds with methyl.

Further examples of the group (A) to (E) compounds include organic compounds having unsaturated groups. Specific examples of such compounds include vinylphenyl thioglycidyl ether, vinylbenzyl thioglycidyl ether, thioglycidyl methacrylate, thioglycidyl acrylate and allyl thioglycidyl ether.

It should be noted that the compound having the radical represented by the formula (I) is not limited to the above examples.

Among the above compounds, preferred are the group (B) compounds (Y of the formula (I) is O), the group (C) compound (Y of the formula (I) is S) and the group (D) compound (Y of the formula (I) is Se). More preferred are the group (C) and (D) compounds. The group (C) and (D) compounds wherein m is 1 or 2 and n is 1 or 2 are still more preferable, and particularly preferable when m is 1 and n is 1 or 2. Examples of the particularly preferable compound include bis(β-epithiopropyl) sulfide, bis(β-epithiopropyl) disulfide, bis(β-epithiopropyl) selenide and bis(β-epithiopropyl) diselenide. Other examples are chain compounds, branched compounds, alicyclic compounds, aromatic compounds and heterocyclic compounds which have at least two β-epithiopropylthio groups or β-epithiopropylseleno groups, which are described above as the examples. Among the particularly preferable compounds, chain compounds and branched compounds which have at least two β-epithiopropylthio groups or β-epithiopropylseleno groups, bis(β-epithiopropyl) sulfide, bis(β-epithiopropyl) disulfide, bis(β-epithiopropyl) selenide and bis(β-epithiopropyl) diselenide are most preferable.

The compounds having the radical represented by the formula (I) may be produced by the methods described in U.S. Pat. Nos. 5,807,975 and 5,945,504, and European Patent Publication 1024223.

The bluing agents usable in the present invention are inorganic or organic pigments, preferably those pigments capable of being homogeneously dissolved or dispersed in the composition for optical materials, more preferably organic pigments capable of being homogeneously dissolved in the composition for optical materials. In accordance with the Color Index Classification, examples of such organic pigments include azo compounds such as C.I. Azoic Violet 2, C.I. Azoic Blue 6, C.I. Azoic Blue 7, etc.; anthraquinone compounds such as C.I. Solvent Violet 33, C.I. Solvent Violet 36, C.I. Solvent Blue 94, C.I. Solvent Blue 95, C.I. Solvent Blue 78, etc.; and phthalocyanine compounds such as C.I. Solvent Blue 55. Other examples include isoindolinone compounds, quinacridone compounds and perylene compounds. Of these organic pigments, most preferred are the anthraquinone compounds.

The bluing agents may be used alone or in combination of two or more. The bluing agents generally include blue, violet and green pigments.

Further, the composition may be added with another red, orange or brown pigment to adjust the color tone of the optical material. Examples of the red, orange and brown pigments include azo compounds such as C.I. Pigment Yellow12, C.I. Pigment Yellow 14, etc.; anthraquinone compounds such as C.I. Pigment Red 83, C.I. Vat Yellow 3, C.I. Vat Yellow 20, C.I. Pigment Brown 7, etc.; quinacridone compounds such as C.I. Quinacridone Yellow 2, etc.; and perylene compounds. Of these pigments, especially preferred are the red, orange and brown anthraquinone compounds.

The amount of the bluing agent to be added varies depending upon kind of the bluing agent, kind of the monomer, kind and amount of the additive such as ultraviolet light absorber and antioxidant, polymerization temperature and time or the like, and usually is in the range of 0.000001 to 0.5 part by weight based on 100 parts by weight of the composition for optical materials. When the amount is less than 0.000001 part by weight, no appreciable effect of adding the bluing agent is obtained. When more than 0.5 part by weight, the resin obtained after the polymerization and curing is disadvantageously colored from blue to black.

The amount of the red, orange or brown pigment optionally added for adjusting the color tone of the optical material is in the range of 0.000001 to 0.0005 part by weight based on 100 parts by weight of the composition for optical materials.

The composition may include a curing catalyst for producing the optical materials. Examples of the curing catalyst include amines, phosphines, quaternary ammonium salts, quaternary phosphonium salts, tertiary sulfonium salts, secondary iodonium salts, mineral acids, Lewis acids, organic acids, silicic acids, tetrafluoroboric acid or the like, as described in European Patent Publication 0978513.

The amount of the curing catalyst to be added is 0.001 to 10.0 parts by weight, preferably 0.005 to 5.0 parts by weight based on 100 parts by weight of the composition comprising the compound having the radical represented by the formula (I).

The compound having the radical represented by the formula (I) may be polymerized with a compound having at least one functional group capable of reacting with a β-epi(poly)thioalkyl group in the formula (I) and/or at least one self-polymerizable functional group or a compound having at least one self-polymerizable functional group which is also capable of reacting with the β-epi(poly)thioalkyl group. These compounds may be used in an amount of 0.001 to 500 parts by weight based on 100 parts by weight of the composition, and specific examples thereof are described in U.S. Pat. No. 5,945,504.

When the compound having the radical represented by the formula (I) is polymerized with a compound having an unsaturated group, the polymerization is preferably conducted in the presence of a radical polymerization initiator as polymerization promoter in an amount of 0.001 to 5.0 parts by weight based on 100 parts by weight of the composition for optical materials. Any compound may be used as the radical polymerization initiator as long as the compound produces radicals by heating or irradiation of ultraviolet light or electron beam. Specific examples thereof are described in U.S. Pat. No. 5,945,504.

To make the cured materials highly oxidation-resistant, a compound having at least one SH group may be contained in the composition as an antioxidant component either alone or in combination with a another known antioxidant. The content thereof is preferably 0.001 to 80% by weight based on the composition. Example of the compounds having at least one SH group include mercaptans and thiophenols which may have an unsaturated group such as vinyl, aromatic vinyl, methacrylic group, acrylic group and allyl. Specific examples thereof are described in U.S. Pat. No. 5,945,504.

To improve the properties of the optical materials such as dyeability and mechanical strength, a compound having at least one active hydrogen other than that of SH group may be contained in the composition in an amount of 0.001 to 40% by weight based on the composition. The "active hydrogen" referred to herein means, for example, hydrogen of hydroxy, carboxyl and amide, and hydrogen at 2-position of 1,3-diketones, 1,3-dicarboxylic acids and esters thereof, and 3-ketocarboxylic acids and esters thereof. Examples of the compound having at least one active hydrogen per one molecule include alcohols, phenols, mercaptoalcohols, hyroxythiophenols, carboxylic acids, mercaptocarboxylic acids, hydroxycarboxylic acids, amides, 1,3-diketones, 1,3-dicarboxylic acids and esters thereof, 3-ketocarboxylic acids and esters thereof. These compounds may have an unsaturated group such as vinyl, aromatic vinyl, methacrylic group, acrylic group and allyl. Specific examples are described in U.S. Pat. No. 5,945,504.

Further, a compound having at least one isocyanate group may be contained in the composition in an amount of 0.001 to 80% by weight based on the composition to enhance the mechanical strength of the optical materials. Specific examples thereof are described in U.S. Pat. No. 6,130,307 which is incorporated herein by reference.

Furthermore, to enhance the refractive index, an inorganic compound containing sulfur and/or selenium may be contained in the composition for optical materials in an amount of 0.001 to 50% by weight based on the composition. Specific examples thereof are described in European Patent Publication 1046931 which is incorporated herein by reference.

A known additive such as an antioxidant and an ultraviolet light absorber may also be contained in the composition in a total amount of 0.001 to 5.0% by weight based on the composition to improve the utility of the optical materials. Further, the composition for optical materials used in the present invention tends to be separated from the surface of a mold cavity during the polymerization operation. Therefore, if required, a known external and/or internal adhesion modifiers are used or added to the composition to effectively improve the adhesion between the cured material and the surface to the mold cavity.

In the process for the production of the optical material according to the present invention, the compound having at least one radical represented by the formula (I) per one molecule is mechanically mixed with the bluing agent together with the optional additive such as catalyst, adhesion modifier, antioxidant, ultraviolet light absorber, radical polymerization initiator and various other modifiers to prepare a uniform composition. The composition is injected into a mold made of glass or metal where the composition is heated, thereby carrying out polymerization and curing. Then, the resultant cured product is removed from the mold to obtain the optical material.

Prior to injecting the composition into the mold, a part or whole of the composition may be subjected to pre-polymerization at −100 to 160° C. for 0.1 to 288 hours in the presence or absence of a catalyst with or without stirring, and then the pre-polymerized composition may be injected into the mold. The pre-polymerization is preferably conducted at −10 to 100° C. for 1 to 144 hours, more preferably at 0 to 60° C. for 1 to 96 hours. The bluing agent may be added to the composition either before or after the pre-polymerization.

The process of the present invention will explained below in more detail. As described above, after the main and optional starting materials are mixed together, the resultant composition is injected into the mold and then cured therein. The composition is prepared by mixing the compound having at least one radical represented by the formula (I) per one molecule, the bluing agent and the optional component such as the curing catalyst, the compound having at least one functional group capable of reacting with a β-epi(poly)thioalkyl group in the formula (I) and/or at least one self-polymerizable functional group, the compound having at least one self-polymerizable functional group which is also capable of reacting with the β-epi(poly)thioalkyl group, the antioxidant component, the modifier for improving dyeability and mechanical strength, the refractive index modifier, the adhesion improver, the stabilizer and the radical polymerization initiator, all may be simultaneously mixed together in a common container under stirring. The above ingredients are all mixed simultaneously in a single vessel under stirring. Alternatively, the ingredients may be sequentially added to the vessel, or the ingredients may be divided into two or more groups which are separately mixed in different vessels and then mixed combinedly in a single vessel. The order of addition of the main and optional components is not particularly restricted. The mixing temperature and the mixing time are not particularly limited as long as the ingredients are thoroughly mixed together.

However, excessively high mixing temperature and excessively long mixing time tends to cause undesired reactions of the ingredients and increases the viscosity of the resultant composition, this making the injection operation of the composition into the mold difficult. Accordingly, the mixing temperature is preferably about −50 to about 100° C., more preferably −30 to 50° C., most preferably −5 to 30° C. The mixing time is preferably one minute to 5 hours, more preferably from 5 minutes to 2 hours, particularly preferably 5 to 30 minutes, most preferably 5 to 15 minutes.

The respective ingredients may be suitably degassed under reduced pressure before, during or after the mixing operation to prevent generation of bubbles in the subsequent polymerizing/curing operation in the mold. The reduced pressure for the degassing is preferably about 0.1 to 700 mmHg, more preferably 10 to 300 mmHg. Further, the ingredients before mixing or a mixture thereof is preferably passed through a filter having a pore size of 0.05 to 3 μm to purify the resultant composition by removing impurities, thereby further enhancing the quality of the optical material of the present invention.

The composition thus prepared is injected into the mold made of glass or metal, and then subjected to polymerization/curing by using an electric furnace or the like. The polymerization/curing time is preferably 0.1 to 100 hours, more preferably 1 to 48 hours. The polymerization/curing temperature is preferably −10 to 160° C., more preferably −10 to 140° C. The polymerization/curing of the composition may be conducted by holding the temperature at a predetermined level for a predetermined period of time, by raising the temperature at a rate of 0.1 to 100° C./hr, by lowering the temperature at a rate of 0.1 to 100° C./hr, or by a combination thereof.

After completion of the polymerization/curing, the obtained product is preferably annealed at 50 to 150° C. for about 10 minutes to 5 hours to remove distortion. Further, if required, the optical material of the present invention may be surface-treated for dyeing, hard-coating, anti-reflection and anti-fogging.

As described above, a colorless and transparent optical material having a high refractive index is produced by adding a bluing agent to a composition for optical materials and then subjecting the resultant composition to polymerization/curing.

The present invention will be described in more detail by reference to the following examples. However, it should be noted that the following examples are illustrative and not intended to limit the invention thereto.

In the following Examples and Comparative Examples, the appearance of lens was visually observed and the refractive index (nD) and the Abbe's number were measured at 25° C. using an Abbe refractometer.

EXAMPLE 1

A homogeneous liquid composition was prepared by mixing 95 parts by weight of 1,2-bis(β-epithiopropylthio)ethane, 5 parts by weight of 2-mercaptoethanol, 0.0005 part by weight of Diaresin Blue G (anthraquinone bluing agent produced by Mitsubishi Chemical Corp.), 0.1 part by weight of tetrabromophosphonium bromide as a catalyst and 0.1 part by weight of Sumisolve 340 as an ultraviolet light absorber (produced by Sumitomo Chemical Corp.). The liquid composition was injected into a mold for 2.5 mm-thick flat lens. The mold filled with the liquid composition was placed in an oven and heated from 30° C. to 120° C. over 20 hours to polymerize and cure the composition, thereby obtaining a colorless and transparent lens. The measured refractive index and Abbe's number of the lens are shown in Table 1.

EXAMPLES 2–4

The same procedure as in Example 1 was repeated except that the composition and bluing agent shown in Table 1 were used. The appearance, the refractive index and the Abbe's number of the obtained lens are shown in Table 1.

EXAMPLE 5

The same procedure as in Example 1 was repeated except that the composition, the bluing agent and the red anthraquinone pigment (Sumiplast HL5B produced by Sumitomo Chemical Corp.) shown in Table 1 were used. The appearance, the refractive index and the Abbe's number of the obtained lens are shown in Table 1.

EXAMPLES 6–8 and COMPARATIVE EXAMPLES 1–5

The same procedure as in Example 1 was repeated except that the composition and bluing agent shown in Table 1 were used. The appearance, the refractive index and the Abbe's number of the obtained lens are shown in Table 1.

TABLE 1

| Examples | Chemical Composition (part by weight) |
|---|---|
| 1 | 1,2-bis(β-epithiopropylthio)ethane/2-mercaptoethanol = 95/5 |
| 2 | 1,2-bis(β-epithiopropylthio)ethane = 100 |
| 3 | 1,2-bis(β-epithiopropylthioethyl)sulfide = 100 |
| 4 | bis(β-epithiopropyl)sulfide/bis(2-mercaptoethylethyl)sulfide = 95/5 |
| 5 | bis(β-epithiopropyl)sulfide/bis(2-mercaptoethylethyl)sulfide/3-phenoxy-2-hydroxypropyl acrylate = 90/5/5 |
| 6 | bis(β-epithiopropyl)sulfide/sulfur = 90/10 |
| 7 | bis(β-epithiopropyl)sulfide/sulfur/selenium sulfide = 77/20/3 |
| 8 | bis(β-epithiopropyl)sulfide = 100 |
| Comparative Examples | |
| 1 | 1,2-bis(β-epithiopropylthio)ethane/2-mercaptoethanol = 95/5 |
| 2 | 1,2-bis(β-epithiopropylthio)ethane/2-mercaptoethanol = 95/5 |
| 3 | 1,2-bis(β-epithiopropylthio)ethane/2-mercaptoethanol = 95/5 |
| 4 | 1,2-bis(β-epithiopropylthioethyl)sulfide = 100 |
| 5 | bis(β-epithiopropyl)sulfide = 100 |

| | Bluing agent (part by weight) | Appearance of lens | Refractive index | Abbe's number |
|---|---|---|---|---|
| Examples | | | | |
| 1 | BlueG (0.0005) | colorless transparency | 1.70 | 36 |
| 2 | BlueG (0.001) | colorless transparency | 1.70 | 36 |
| 3 | BlueG (0.002) | colorless transparency | 1.70 | 36 |
| 4 | BlueG (0.0005) | colorless transparency | 1.70 | 36 |
| 5 | BlueG (0.0002) RedHL5B (0.00005) | colorless transparency | 1.70 | 36 |
| 6 | BlueG (0.01) | colorless transparency | 1.72 | 34 |
| 7 | BlueG (0.1) | colorless transparency | 1.75 | 31 |
| 8 | BlueA-D (0.00001) | colorless transparency | 1.71 | 36 |

TABLE 1-continued

| Comparative Examples | | | | |
|---|---|---|---|---|
| 1 | — | light-yellowish transparency | 1.70 | 36 |
| 2 | BlueG (0.0000008) | light-yellowish transparency | 1.70 | 36 |
| 3 | BlueG (0.7) | bluish transparency | 1.70 | 36 |
| 4 | — | yellowish transparency | 1.70 | 36 |
| 5 | — | yellowish transparency | 1.71 | 36 |

BlueG: Diaresin Blue G (Anthraquinone pigment produced by Mitsubishi Chemical Corp.) C.I. Solvent Violet 36
BlueA-D: Kayaset Blue A-D (Anthraquinone pigment produced by Nippon Kayaku Co. Ltd.) C.I. Solvent Violet 33
RedHL5B: Sumiplast HL5B (Anthraquinone pigment produced by Sumitomo Chemical Corp.) C.I. Pigment Red 83

What is claimed is:

1. A process for producing an optical material, comprising:

adding a bluing agent to a composition for optical materials comprising a compound having a radical represented by the formula (I):

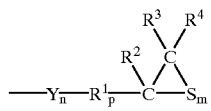

(I)

wherein $R^1$ is $C_1$-$C_{10}$ hydrocarbon group; $R^2$, $R^3$ and $R^4$ are each independently $C_1$-$C_{10}$ hydrocarbon group or hydrogen; Y is O, S, Se or Te; p is 0 or 1; m is an integer of 1 to 5; and n is an integer of 0 to 5, thereby preparing a molding composition; and subjecting the molding composition to polymerization and curing in a mold.

2. The process according to claim 1, wherein the amount of the compound having the radical represented by the formula (I) is 10% by weight or more based on the total weight of the composition for optical materials.

3. The process according to claim 1, wherein the bluing agent is added to the composition for optical materials in an amount of 0.000001 to 0.5 part by weight based on 100 parts by weight of the composition.

4. The process according to claim 1, wherein the bluing agent is an anthraquinone compound.

5. The process according to claim 1, wherein the molding composition is prepared by mixing at −50 to 100° C. for one minute to 5 hours.

6. The process according to claim 1, wherein the molding composition is subjected to pre-polymerization at −100 to 160° C. for 0.1 to 288 hours prior to injecting the molding composition into the mold.

7. The process according to claim 1, wherein the molding composition is subjected to polymerization/curing at −10 to 160° C. for 0.1 to 100 hours.

8. The process according to claim 1, wherein the composition for optical materials is further added with a red anthraquinone compound, an orange anthraquinone compound or a brown anthraquinone compound.

9. The process according to claim 8, wherein the red anthraquinone compound, an orange anthraquinone compound or a brown anthraquinone compound is added in an amount of 0.000001 to 0.0005 part by weight based on 100 parts by weight of the composition for optical materials.

10. An optical material produced by the process according to claim 1.

* * * * *